US012342268B2

(12) United States Patent
Chak et al.

(10) Patent No.: US 12,342,268 B2
(45) Date of Patent: Jun. 24, 2025

(54) SMART PHONE TOGGLE FOR MULTI-NETWORK CONNECTIVITY

(71) Applicant: Google LLC, Mountain View, CA (US)

(72) Inventors: Daniel Chak, Mountain View, CA (US); Varun Anand, Mountain View, CA (US); Alex Stillwell, Mountain View, CA (US); Shishir Agrawal, Mountain View, CA (US); Qingxi Li, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 390 days.

(21) Appl. No.: 17/756,796

(22) PCT Filed: Dec. 11, 2019

(86) PCT No.: PCT/US2019/065807
§ 371 (c)(1),
(2) Date: Jun. 2, 2022

(87) PCT Pub. No.: WO2021/118563
PCT Pub. Date: Jun. 17, 2021

(65) Prior Publication Data
US 2023/0012793 A1    Jan. 19, 2023

(51) Int. Cl.
*H04W 48/18* (2009.01)
*G06F 3/0481* (2022.01)
(Continued)

(52) U.S. Cl.
CPC .......... *H04W 48/18* (2013.01); *G06F 3/0481* (2013.01); *H04W 24/10* (2013.01); *H04W 76/30* (2018.02); *H04W 88/06* (2013.01)

(58) Field of Classification Search
CPC ..... H04W 48/18; H04W 24/10; H04W 76/30; H04W 88/06; H04W 12/03;
(Continued)

(56) References Cited

U.S. PATENT DOCUMENTS 8,638,794 B1    1/2014  Ephraim et al.
9,173,104 B2 *  10/2015 Raleigh ................. H04M 15/66
(Continued)

FOREIGN PATENT DOCUMENTS

CN    104067571 A    9/2014
CN    106131930 A    11/2016
(Continued)

OTHER PUBLICATIONS

Indian Office Action issued Oct. 20, 2022 in Indian Patent Application No. 202247038525, 10 pages.
(Continued)

*Primary Examiner* — Jung H Park
(74) *Attorney, Agent, or Firm* — Oblon, McClelland, Maier & Neustadt, L.L.P.

(57) ABSTRACT

A method (500) for toggling multi-network connectivity of a mobile device (110) includes, for the mobile device simultaneously connected to one or more carrier-mediated wireless networks (120) associated with a network operator (70), executing a graphical user interface that renders a status graphic (320) indicating the mobile device is currently connected to at least one carrier-mediated wireless network associated with the network operator, and an interactive graphic (330) for selecting between disabling and enabling connections (122) between the mobile device and carrier-mediated wireless networks associated with the network operator. The method includes receiving a user input indication (312) indicating selection of the interactive graphic and in response, disconnecting the mobile device from each
(Continued)

of the carrier-mediated wireless networks associated with the network operator and updating the status graphic to indicate that the mobile device is not currently connected to any carrier-mediated wireless networks associated with the network operator.

28 Claims, 9 Drawing Sheets

(51) Int. Cl.
  *H04W 24/10* (2009.01)
  *H04W 76/30* (2018.01)
  *H04W 88/06* (2009.01)

(58) Field of Classification Search
  CPC ... H04W 12/069; H04W 12/40; H04W 24/02; G06F 3/0481; G06F 3/0488; G06F 3/0484; H04L 63/0272
  See application file for complete search history.

(56) References Cited

U.S. PATENT DOCUMENTS

| | | | |
|---|---|---|---|
| 2006/0075090 A1 | 4/2006 | Bocking et al. | |
| 2014/0149262 A1* | 5/2014 | Parekh | H04L 43/0882 709/224 |
| 2015/0004995 A1* | 1/2015 | Koc | H04W 72/02 455/454 |
| 2015/0131483 A1 | 5/2015 | Colban et al. | |
| 2015/0334761 A1* | 11/2015 | Liao | H04W 76/15 455/552.1 |
| 2016/0205593 A1 | 7/2016 | Kauppinen et al. | |
| 2017/0001718 A1 | 6/2017 | Waltermann et al. | |
| 2017/0164190 A1* | 6/2017 | Weksler | H04W 12/08 |
| 2017/0171736 A1* | 6/2017 | Weksler | H04M 15/61 |
| 2017/0171804 A1* | 6/2017 | Waltermann | H04W 40/02 |
| 2017/0230818 A1 | 8/2017 | Park et al. | |
| 2017/0245208 A1 | 8/2017 | Sirotkin et al. | |
| 2018/0088795 A1 | 3/2018 | van Os et al. | |
| 2018/0164963 A1 | 6/2018 | Ku et al. | |

FOREIGN PATENT DOCUMENTS

| | | |
|---|---|---|
| DE | 20 2016 107 473 U1 | 5/2017 |
| WO | WO 2015/059860 A1 | 4/2015 |
| WO | 2017087232 A1 | 5/2017 |

OTHER PUBLICATIONS

Aug. 27, 2020 Written Opinion (WO) of the International Searching Authority (ISA) and International Search Report (ISR) issued in International Application No. PCT/US2019/065807.
Korean Office Action issued May 27, 2024 in Korean Patent Application No. 10-2022-7023614 (with English translation), 17 pages.
Combined Chinese Office Action and Search Report issued Dec. 25, 2023 in Chinese Application 201980102848.6, (with English translation), 20 pages.
Japanese Notice of Reasons for Refusal issued Jul. 4, 2023 in Japanese Patent Application No. 2022-535721, (with English translation), 7 pages.
Office Action issued Dec. 12, 2024, in corresponding European Patent Application No. 19 838 996.7, 17 pages.

* cited by examiner

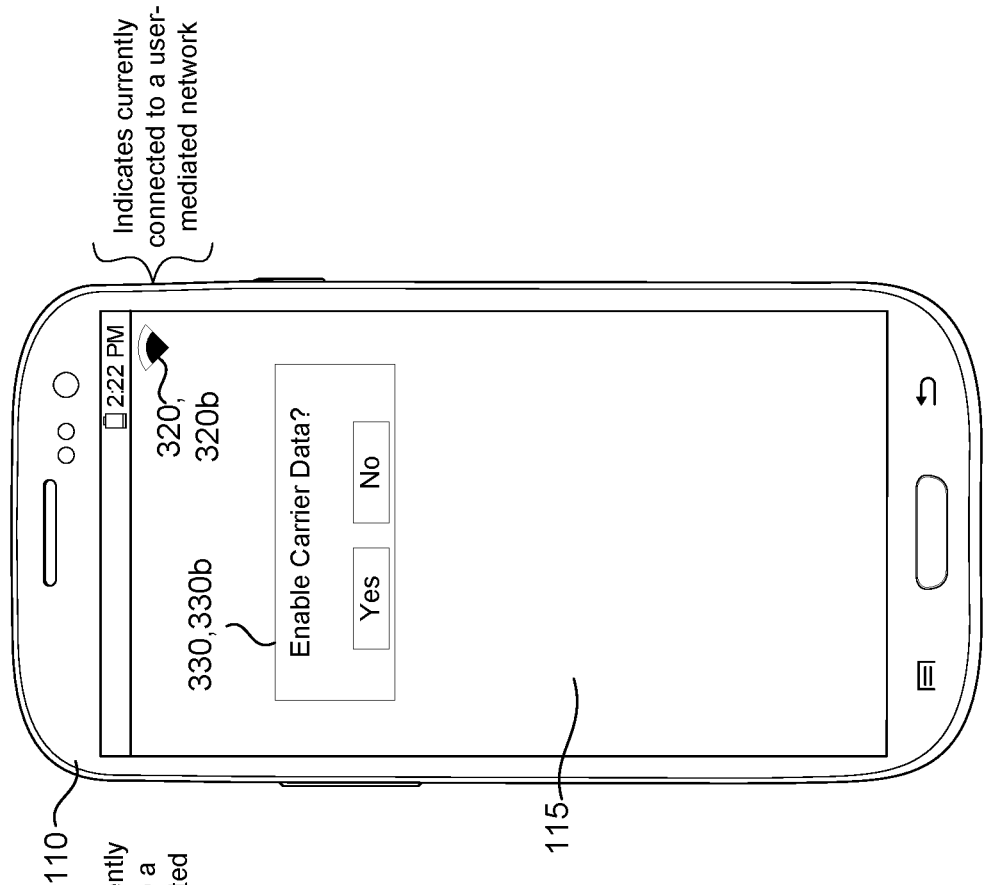
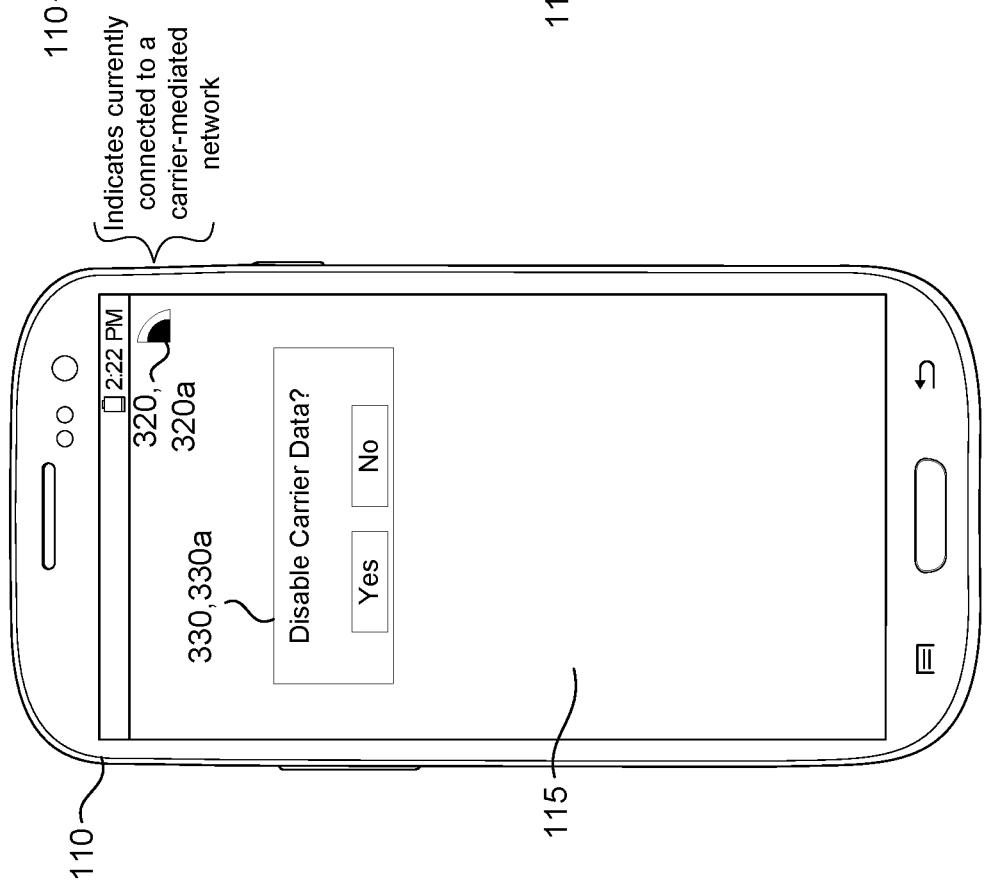
FIG. 4B
FIG. 4A

SMART PHONE TOGGLE FOR MULTI-NETWORK CONNECTIVITY

TECHNICAL FIELD

This disclosure relates to toggling multi-network connectivity of a user device.

BACKGROUND

Mobile devices (e.g., smart phones) and other user devices typically offer a host of different wireless connection technologies (e.g., cellular, Wi-Fi, Bluetooth, etc.). In order to reduce the costs of mobile data, mobile network operators (MNOs) and mobile virtual network operators (MNVOs) are frequently mediating additional lower-cost networks (e.g., Wi-Fi networks) and off-loading customer mobile data off cellular connections (e.g., 4G, 5G, etc.) and onto the lower-cost networks when possible. Modern mobile operating systems do not clearly distinguish between these carrier-mediated network connection and user-mediated network connections and instead offer control over connections to the mobile device on a radio-by-radio basis.

SUMMARY

One aspect of the disclosure provides a method of toggling multi-network connectivity. In some implementations, the method includes, for a mobile device connected to one or more carrier-mediated wireless networks associated with a first network operator, each network simultaneously connected to the mobile device, executing, by data processing hardware of the mobile device, a graphical user interface for display on a screen in communication with the data processing hardware. The graphical user interface renders a status graphic indicating the mobile device is currently connected to at least one carrier-mediated wireless network of the one or more carrier-mediated wireless networks associated with the first network operator. The method also includes an interactive graphic configured to receive user input indications for selecting between disabling connections between the mobile device and any available carrier-mediated wireless networks associated with the first network operator and enabling connections between the mobile device and any available carrier-mediated wireless networks associated with the first network operator. The method also includes receiving, at the data processing hardware, a first user input indication indicating selection of the interactive graphic rendered in the graphical user interface for disabling connections between the mobile device and any available carrier-mediated wireless networks associated with the first network operator. In response to receiving the first user input indication, the method includes disconnecting, by the data processing hardware, the mobile device from each of the one or more carrier-mediated wireless networks associated with the first network operator. The method also includes updating, by the data processing hardware, the status graphic to indicate that the mobile device is not currently connected to any carrier-mediated wireless networks associated with the first network operator. When connections between the mobile device and any available carrier-mediated wireless networks associated with the first network operator are disabled in response to receiving the first user input indication, connections between the mobile device and any available wireless networks associated with network operators other than the first network operator are enabled.

Implementations of the disclosure may include one or more of the following optional features. In some implementations, when the mobile device is simultaneously connected to at least two carrier-mediated wireless networks associated with the first network operator, the method includes identifying, by the data processing hardware, one of the at least two carrier-mediated networks as a priority carrier-mediated wireless network associated with the first network operator. The status graphic rendered in the graphical user interface may indicate that the mobile device is currently connected to the priority carrier-mediated wireless network.

In some examples, when the mobile device is simultaneously connected to at least two carrier-mediated wireless networks associated with the first network operator, for each carrier-mediated wireless network of the at least two carrier-mediated wireless networks the mobile device is simultaneously connected to, determining, by the data processing hardware, a connection quality of the connection between the mobile device and the corresponding carrier-mediated wireless network. The method may also include identifying, by the data processing hardware, which carrier-mediated wireless network of the at least two carrier-mediated wireless networks the mobile device is simultaneously connected to is associated with a highest connection quality. The status graphic rendered in the graphical user interface indicates the connection between mobile device and the identified carrier-mediated wireless network associated with the highest connection quality. Optionally, the status graphic rendered in the graphical user interface further indicates a value of the connection quality of the connection between the mobile device and the identified carrier-mediated wireless network associated with the highest connection quality.

The method, prior to receiving the first user input indication and with the mobile device simultaneously connected to at least a first carrier-mediated wireless network and a second carrier-mediated wireless network, the first carrier-mediated wireless network may include a carrier-mediated cellular network associated with the first network operator and the second carrier-mediated wireless network may include a carrier-mediated wireless fidelity (Wi-Fi) network associated with the first network operator. In some examples, in response to receiving the first user input indication, the method includes connecting, by the data processing hardware, the mobile device to one or more wireless networks associated with a second network operator different than the first network operator. In these examples, when the one or more wireless networks associated with the second network operator include user-mediated wireless networks, updating the status graphic to indicate that the mobile device is not currently connected to any carrier-mediated wireless networks associated with the first network operator in response to receiving the first user input indication may also include updating the status graphic to indicate that the mobile device is now currently connected to the one or more user-mediated wireless network associated with the second network operator.

In some implementations, disconnecting the mobile device from each of the one or more carrier-mediated wireless networks associated with the first network operator includes disconnecting the mobile device from at least one wireless fidelity (Wi-Fi) network among the one or more carrier-mediated wireless networks associated with the first network operator. Connecting the mobile device to the one or more wireless networks associated with the second network operator may include connecting the mobile device to at least one Wi-Fi network among the one or more wireless networks associated with the second network operator. The one or more wireless networks associated with the second network operator include carrier-mediated wireless networks or user-mediated wireless networks. In response to receiving the first user input indication, the method may include maintaining, by the data processing hardware, any existing connections between the mobile device and wireless networks associated with network operators other than the first network operator.

In some implementations, after receiving the first user input indication, the method includes receiving, at the data processing hardware, a second user input indication indicating selection of the interactive graphic rendered in the graphical user interface for enabling connections between the mobile device and any available carrier-mediated wireless networks associated with the first network operator. In response to receiving the second user input indication, the method may include connecting, by the data processing hardware, the mobile device to one or more available carrier-mediated wireless networks associated with the first network operator and re-updating, by the data processing hardware, the status graphic to indicate that the mobile device is currently connected to at least one carrier-mediated wireless network associated with the first network operator.

In some examples, executing the graphical user interface for display on the screen further causes the graphical user interface to render a second status graphic indicating the mobile device is currently connected to at least one wireless network that is not associated with the first network operator. In some implementations, the method includes displaying, by the data processing hardware, a second graphical indication indicating a connection quality of at least one wireless connection associated with a different operator. In some example, the method incudes, when connections between the mobile device and any available carrier-mediated wireless networks associated with the first network operator are disabled in response to receiving the first user input indication, a radio of the mobile device associated with at least one of the carrier-mediated wireless networks associated with the first network operator remains enabled.

Another aspect of the disclosure provides a system for toggling multi-network connectivity. The system includes data processing hardware and memory hardware in communication with the data processing hardware. The memory hardware stores instructions that when executed on the data processing hardware cause the data processing hardware to perform operations. The operations include, for the mobile device connected to one or more carrier-mediated wireless networks associated with a first network operator, each network simultaneously connected to the mobile device, executing a graphical user interface for display on a screen in communication with the data processing hardware. The graphical user interface renders a status graphic indicating the mobile device is currently connected to at least one carrier-mediated wireless network of the one or more carrier-mediated wireless networks associated with the first network operator. The operations also include an interactive graphic configured to receive user input indications for selecting between disabling connections between the mobile device and any available carrier-mediated wireless networks associated with the first network operator and enabling connections between the mobile device and any available carrier-mediated wireless networks associated with the first network operator. The operations also include receiving a first user input indication indicating selection of the interactive graphic rendered in the graphical user interface for disabling connections between the mobile device and any available carrier-mediated wireless networks associated with the first network operator. In response to receiving the first user input indication, the operations include disconnecting the mobile device from each of the one or more carrier-mediated wireless networks associated with the first network operator. The operations also include updating the status graphic to indicate that the mobile device is not currently connected to any carrier-mediated wireless networks associated with the first network operator. When connections between the mobile device and any available carrier-mediated wireless networks associated with the first network operator are disabled in response to receiving the first user input indication, connections between the mobile device and any available wireless networks associated with network operators other than the first network operator are enabled.

This aspect may include one or more of the following optional features. In some implementations, when the mobile device is simultaneously connected to at least two carrier-mediated wireless networks associated with the first network operator, the operations include identifying one of the at least two carrier-mediated networks as a priority carrier-mediated wireless network associated with the first network operator. The status graphic rendered in the graphical user interface may indicate that the mobile device is currently connected to the priority carrier-mediated wireless network.

In some examples, when the mobile device is simultaneously connected to at least two carrier-mediated wireless networks associated with the first network operator, for each carrier-mediated wireless network of the at least two carrier-mediated wireless networks the mobile device is simultaneously connected to, determining a connection quality of the connection between the mobile device and the corresponding carrier-mediated wireless network. The operations may also include identifying which carrier-mediated wireless network of the at least two carrier-mediated wireless networks the mobile device is simultaneously connected to is associated with a highest connection quality. The status graphic rendered in the graphical user interface indicates the connection between mobile device and the identified carrier-mediated wireless network associated with the highest connection quality. Optionally, the status graphic rendered in the graphical user interface further indicates a value of the connection quality of the connection between the mobile device and the identified carrier-mediated wireless network associated with the highest connection quality.

The operations, prior to receiving the first user input indication and with the mobile device simultaneously connected to at least a first carrier-mediated wireless network and a second carrier-mediated wireless network, the first carrier-mediated wireless network may include a carrier-mediated cellular network associated with the first network operator and the second carrier-mediated wireless network may include a carrier-mediated wireless fidelity (Wi-Fi) network associated with the first network operator. In some examples, in response to receiving the first user input indication, the operations include connecting the mobile device to one or more wireless networks associated with a second network operator different than the first network operator. In these examples, when the one or more wireless networks associated with the second network operator include user-mediated wireless networks, updating the status graphic to indicate that the mobile device is not currently connected to any carrier-mediated wireless networks associated with the first network operator in response to receiving the first user input indication may also include updating the status graphic to indicate that the mobile device is now currently connected to the one or more user-mediated wireless network associated with the second network operator.

In some implementations, disconnecting the mobile device from each of the one or more carrier-mediated wireless networks associated with the first network operator includes disconnecting the mobile device from at least one wireless fidelity (Wi-Fi) network among the one or more carrier-mediated wireless networks associated with the first network operator. Connecting the mobile device to the one or more wireless networks associated with the second network operator may include connecting the mobile device to at least one Wi-Fi network among the one or more wireless networks associated with the second network operator. The one or more wireless networks associated with the second network operator include carrier-mediated wireless networks or user-mediated wireless networks. In response to receiving the first user input indication, the operations may include maintaining any existing connections between the mobile device and wireless networks associated with network operators other than the first network operator.

In some implementations, after receiving the first user input indication, the operations include receiving a second user input indication indicating selection of the interactive graphic rendered in the graphical user interface for enabling connections between the mobile device and any available carrier-mediated wireless networks associated with the first network operator. In response to receiving the second user input indication, the operations may include connecting the mobile device to one or more available carrier-mediated wireless networks associated with the first network operator and re-updating the status graphic to indicate that the mobile device is currently connected to at least one carrier-mediated wireless network associated with the first network operator.

In some examples, executing the graphical user interface for display on the screen further causes the graphical user interface to render a second status graphic indicating the mobile device is currently connected to at least one wireless network that is not associated with the first network operator. In some implementations, the operations include displaying a second graphical indication indicating a connection quality of at least one wireless connection associated with a different operator. In some example, when connections between the mobile device and any available carrier-mediated wireless networks associated with the first network operator are disabled in response to receiving the first user input indication, a radio of the mobile device associated with at least one of the carrier-mediated wireless networks associated with the first network operator remains enabled.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 4A and 4B are schematic views of interactive graphics rendered on a graphical user interface executing on a mobile device.

Like reference symbols in the various drawings indicate like elements.

DETAILED DESCRIPTION

Carriers, such as mobile network operators (MNOs) and mobile virtual network operators (MVNOs), are increasingly providing connectivity via multiple heterogeneous network types (e.g., cellular networks and Wi-Fi networks). Current mobile operating systems (OS) do not distinguish clearly between connections that are user-mediated (such as a home Wireless Fidelity (Wi-Fi) network) and carrier-mediated connections, such as a Wi-Fi access point with credentials provided by a carrier or a cellular connection controlled by the carrier (e.g., LTE). User-mediate networks and carrier-mediated networks may have very different properties, and therefore treating the two classes of networks the same often leads to suboptimal user experiences. For example, a carrier may desire to provide session mobility to improve the user experience by tunneling user traffic through a virtual private network (VPN), but cannot do so without clear demarcation between carrier-mediated networks and user-mediated networks. In this case, the carrier may not be able to include user-mediated networks within the VPN (e.g., for privacy concerns).

Furthermore, mobile devices typically have user controls for allowing the user to manage radios on the mobile device. For example, the user may enable/disable the Wi-Fi radio or enable/disable the mobile (i.e., cellular) data radio. The mobile devices also provide status indicators on a radio-by-radio basis rather than on a carrier or operator basis. A user of the mobile device may desire to temporarily disable connectivity from their carrier, which may include elements of multiple different wireless connections (e.g., both Wi-Fi and cellular), but the mobile device lacks any convenient way to do so. At best, the user must disable connectivity on a radio-by-radio basis, which disables all connections from that radio. This may have unintended consequences. For example, disabling a Wi-Fi radio to prevent the mobile device from connecting to a Wi-Fi network provided by a carrier will also prevent connections to other Wi-Fi connections (e.g., to the user's home network) that are not managed by that carrier. Moreover, the mobile device provides visual indicators of radio connectivity (e.g., Wi-Fi or cellular connection strength), but not carrier connectivity. For example, there is no way to discern whether Wi-Fi strength graphical status indicator is associated with a user-mediated Wi-Fi network or a carrier-mediated Wi-Fi network.

Figure 1:
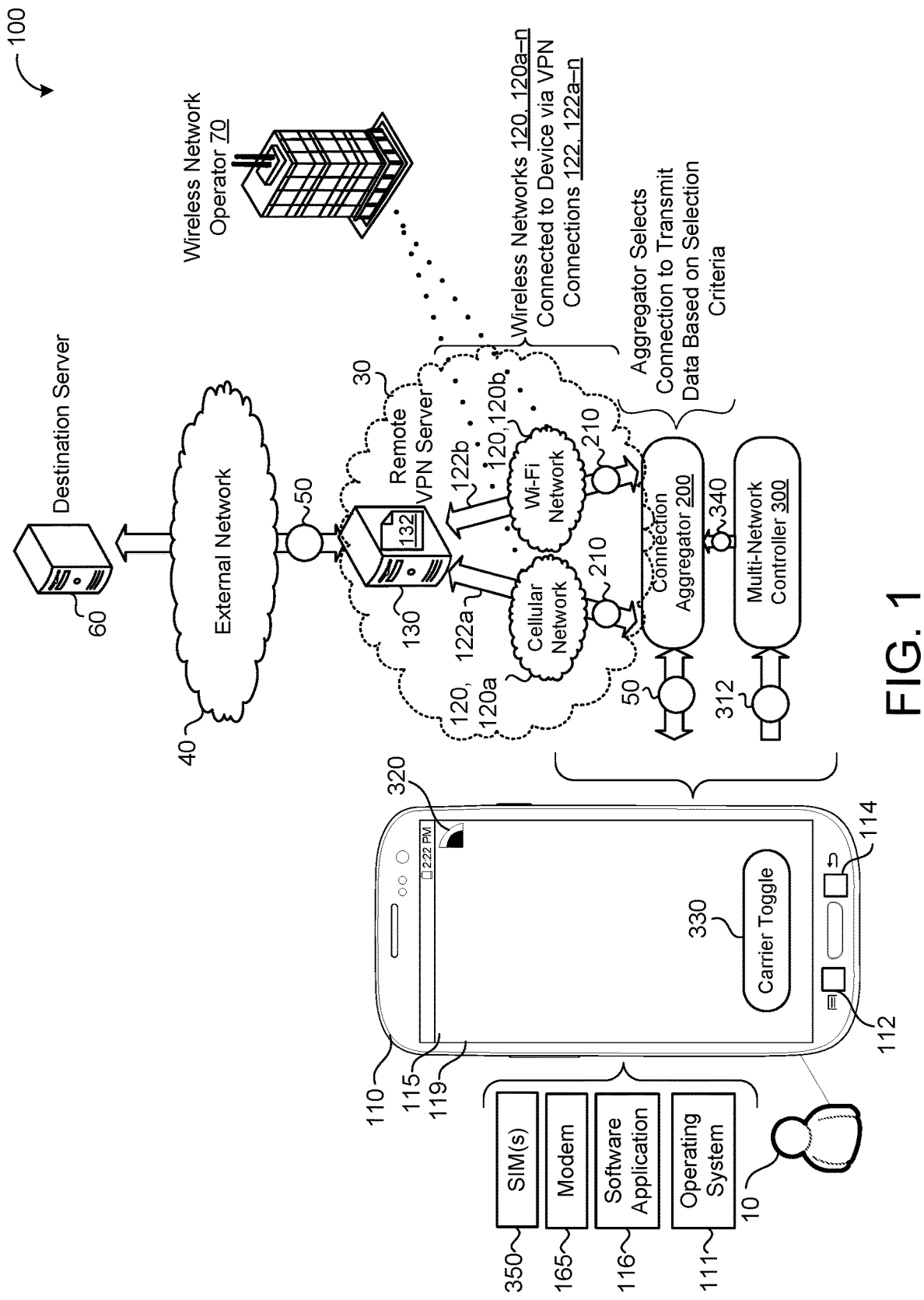
FIG. 1 is a schematic view of an example system for demarcating user-mediated and carrier-mediated connections and providing a multi-network between the different connections.

Implementations herein are directed toward a connection aggregator 200 and a multi-network controller 300 that both execute on a user device 110 for demarcating user-mediated networks from carrier-mediated networks and providing a convenient user input and visual indication to control and report multi-network connectivity. As used herein, the user device 110 may be interchangeably referred to as user equipment (UE) or a mobile device. Referring to FIG. 1, in some implementations, an example wireless communication environment 100 includes the mobile device 110 in communication with an external network 40 through multiple wireless networks 120, 120a—n. For example, the user device 110 may communicate with the external network 40 via a cellular network 120a and a Wi-Fi network 120b. These wireless networks 120 are merely illustrative and the user device 110 may communicate with the external network 40 using other types of wireless networks (e.g., Citizens Broadband Radio Service (CBRS), Bluetooth, etc.). The cellular network 120a may include a General Packet Radio Service (GPRS) network, a Universal Mobile Telecommunications System (UMTS) network, a High Speed Packet Access (HSPA) network, an enhanced-HSPA (H+) network, an Enhanced Data Rates for Global System for Mobile communications (GSM) (EDGE) network, or a Long-Term Evolution (LTE) radio access network (RAN) (e.g., 4G/5G LTE) that supports radio communication of data packets 50 and/or other services from the external network 40 to the user device 110 via, for example, base stations such as macro-cell evolved Node B's (MeNB). The Wi-Fi network 120b may include any version of Wi-Fi (e.g., 802.11n, 802.11ac, etc.) that also supports radio communication of the data packets 50. In some examples, the user device 110 connects to multiple wireless networks 120 of the same type simultaneously. For example, the user device 110 may include capabilities for simultaneously connecting to two separate cellular networks 120a operated by different carriers 70.

The cellular network 120a is associated with a mobile network operator (MNO) or a mobile virtual network operator (MNVO) that provides services of wireless communications to the subscribing user device 110 via the cellular network 120a. The MNO or MVNO may also be referred to as a wireless service provider, wireless carrier, cellular company, mobile network operator, or mobile network carrier. The term "carrier" may be used herein to refer to the MNO or MVNO. The term "network operator" may be used herein to refer to an entity that operates or mediates a wireless network 120, which may include a carrier (e.g., an MNO or MVNO) that operates/mediates a carrier-mediated wireless network 120 or a user 10 that operates/mediates a user-mediated wireless network 120.

As used herein, a carrier-mediated wireless network 120 includes any wireless network 120 managed or mediated or controlled by a single particular carrier 70 (e.g., an MNO or MVNO) where the user device 110 subscribes to a service provided by the carrier. That is, the user 10 does not control or manage the wireless network 120. A carrier-mediated network 120 is a network for which a carrier has provided credentials, such as where either a carrier-provided SIM profile or a carrier-provided application which can be authenticated by the carrier-provided SIM profile, has provided credentials. For example, a SIM profile provided on a UICC allows the user device 110 to attach and authenticate with a cellular network 120. Or, the carrier application is authenticated by the operating system 111 to access the SIM profile. The carrier application may be cryptographically signed with the carrier's private key and authenticated via the signature of the application contained in the SIM profile. The carrier application is authorized by the operating system 111 to provide credentials for accessing, for example, Wi-Fi access points. In some examples, the authenticated carrier application may provide a WPA password or a Hotspot2.0 certificate; or, for an open network where credentials are not needed to connect to the access point, the carrier causes the user device 110 to connect to the access point without need for user intervention, or causes a suggestion to connect to the network to be made to the user, which the user can accept or reject. In the case of carrier-mediated connections to open networks 120, an additional step may be needed to bypass a "captive portal" to gain internet access, such as accepting terms and conditions, or supplying a passcode or other login information. For carrier-mediated connections to open-networks 120 with captive portals, the carrier may accept terms on the user's behalf or provide an email address, passcode or other login information in an automated fashion. An automated fashion may mean providing login information via protocols such as WISPr or via the automated submission of web forms. A single user device 110 can support multiple carrier-mediated wireless networks 120 simultaneously.

A user-mediated wireless network 120 includes any wireless network 120 associated with a network operator 70 that the user device 110 does not explicitly subscribe to such that the user-mediated wireless network 120 is ultimately managed or mediated or controlled by the user 10. A user-mediated network is a network for which the user has provided their own credentials, if necessary, to connect e.g., to an access point, e.g., a WPA password or a user-installed certificate, e.g., a Hotspot2.0 certificate; or, for an open network where credentials to connect to the access point are not needed, the user has taken an affirmative action to connect to the network, such as selecting the network from a list, or accepting a suggestion made by the operating system. Any selection may only occur the first time the device is exposed to the network. On user-mediated open networks, additional manual steps may be needed to bypass a "captive portal" to gain internet access, such as accepting terms and conditions, or supplying an email address, a passcode or other login information.

A single device, e.g., an access point, can provide access to both a user-mediated network and a carrier-mediated network. The user who owns, rents or controls the AP can enable others to access the Internet using the access point, e.g., the user creates a WEP password that the user provides to others. The access point when accessed in that way provides access to a user-mediated network. The cable service provider or DSL service provider may operate a carrier-mediated network service from the same access point. Devices with a HS2.0 certificate provisioned by the carrier app will automatically connect to the same access point. No user intervention or password is required.

In an example where the user has a contract for Internet service provided by a network operator 70 corresponding to an Internet Service Provider (ISP), and thus may select any one of a multitude of different wireless-enabled user devices 110 to connect to the Internet service at any given time, the wireless networks 120 (e.g., Wi-Fi networks 120b) accessed by the selected user devices 110 to use the Internet service correspond to user-mediated wireless networks 120. Here, the user 10 may control a modem that connects to the Internet service, as well as a wireless access point (AP) (e.g., wireless router) in communication with the modem to provide a local area network (LAN) that the selected user devices 110 may establish wireless connections with to use the Internet service. In other examples, a user-mediated wireless network 120 may simply include a Bluetooth connection (or other wireless connection) between the user device 110 and another device in proximity to the user device 110. On the other hand, when a particular user device 110 associated with the user 10 subscribes to services of wireless communications provided by a particular carrier 70 (e.g., an MNO or MVNO), the wireless networks 120 (e.g., cellular and/or Wi-Fi networks 120a, 120b) accessed by the subscribing user device 110 to receive the services of wireless communications correspond to carrier-mediated wireless networks 120. In some implementations, a subscriber identity module (SIM) installed on the user device 110 includes a profile defined by a particular carrier 70 to enable and authenticate the user device 110 to connect to carrier-mediated wireless networks 120 associated with the particular carrier 70. If, however, the user 10 would like to connect other user devices 110 to these carrier-mediated wireless networks 120 associated with the particular carrier 70, each of these other user devices 110 must individually subscribe to the services of wireless communication provided by the particular carrier 70. In these implementations, the user device 110 may freely connect to user-mediated wireless networks 120 associated with one or more network operators 70 other than the particular carrier 70. While the user device 110 is depicted as a mobile device 110 in the example shown, the user device 110 can include any device capable of connecting to wireless networks 120 such as, without limitation, a tablet, laptop, desktop, smart watch, smart speaker, smart display, smart appliance, etc.

The user device 110 includes computing resources 112 (e.g., data processing hardware) and/or storage resources 114 (e.g., memory hardware). The data processing hardware 112 executes a graphical user interface (GUI) 115 for display on a screen 119 in communication with the data processing hardware 112, the connection aggregator 200, and the multi-network controller 300. The data processing hardware 112 further executes an operating system 111 and one or more applications 116. In some implementations, the operating system 111 executes the functionality of the connection aggregator 200 and the multi-network controller 300.

The user device 110 may use a variety of different operating systems 111. In examples where a user device 110 is a mobile device, the user device 110 may run an operating system including, but not limited to, ANDROID® developed by Google Inc., IOS® developed by Apple Inc., or WINDOWS PHONE® developed by Microsoft Corporation. Accordingly, the operating system 111 running on the user device 110 may include, but is not limited to, one of ANDROID®, IOS®, or WINDOWS PHONE®. In some examples a user device may run an operating system including, but not limited to, MICROSOFT WINDOWS® by Microsoft Corporation, MAC OS® by Apple, Inc., or Linux.

The user device 110 further includes at least one modem 165 (also referred to as a baseband or baseband processor). The modem 165 includes one or more antennas that enable the user device to communicate with the operator networks 120 wirelessly. The modem 165 may communicate with one or more radios operating on a variety of frequencies simultaneously (e.g., 700 MHz, 900 MHz, 2.4 GHz, 5.0 GHz etc.). The modem 165 may include various components to provide transmit and receive functions (a processor, memory, etc.). In some implementations, data processing hardware 112 includes the modem 165. That is, tasks executed by the data processing hardware 112, in some examples may instead be executed by the modem 165 and vice versa.

The user device 110 further includes one or more corresponding subscriber identification modules (SIM) 350 for identifying and connecting the user device 110 with certain types of carrier-mediated wireless networks 120. For instance, the SIM 350 may include a corresponding SIM profile with the credentials for authorizing the user device 110 to connect with the cellular network 120a to access the destination server 60 over the external network 40. Similarly, the SIM 350 may include one or more additional SIM profiles with corresponding credentials for authorizing the user device 110 to connect with other carrier-mediated wireless networks 120 managed by network operators 70 other than the network operator managing the cellular network 120a. In some examples, the one or more SIMs 350 include any combination of one or more embedded SIMS (eSIM) and one or more physical SIMs.

The connection aggregator 200 establishes a virtual private network 30 (VPN) between the user device 110 and a remote server 130. The VPN 30 provides a corresponding VPN connection 122, 122a—n for connecting the user device 110 to each public carrier-mediated wireless network 120 operated or managed by the same network operator 70 (i.e., carrier). In some implementations, the VPN 30 provides connections 122 for connecting to wireless networks managed by multiple different network operators 70. In the example shown, the connection aggregator 200 establishes the VPN 30 between the user device 110 and the remote server 130 by using a cellular VPN connection 122a connecting the user device 110 to the remote server 130 over the cellular network 120a (e.g., a first wireless network), and using a Wi-Fi VPN connection 122b connecting the user device 110 to the remote server 130 over the Wi-Fi network 120b (e.g., a second wireless network).

The remote server 130 executes a VPN back-end service 132 that receives data packets 50 from the user device 110 routed by the connection aggregator 200 via one of the connected wireless networks 120 and forwards the data packets 50 to a destination server 60 via the external network 40. The external network 40 may include a packet data network (PDN), which may be the Internet. The external network 40 may be independent from any network related with the user device 110 or the carrier 70 that operates the wireless networks 120. The destination server 60 may be any remote server that an application 116 executing on the user device 110 sends or receives data packets 50 to or from. For example, the destination server 60 may be a web server that hosts web content.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Downstream data packets 50 sent to the user device 110 (e.g., from the destination server 60) are directed to the remote VPN server 130 which in turn forwards the data packet 50 to the connection aggregator 200 via one of the VPN connections 122. The connection aggregator 200 receives the data packets 50 and sends the packets to the appropriate application 116 executing on the user device 110.

In some implementations, the remote VPN server 130 maintains the same Internet Protocol (IP) address when sending and receiving data packets 50 to destination servers 60 despite receiving and sending data packets 50 to the user device 110 through multiple different wireless networks 120 via multiple different wireless connections 122. Thus, from the perspective of the destination server 60, the apparent IP address of the user device 110 (i.e., the IP address of the remote server 130) does not change regardless of which wireless connection 122 is used to route the data packets 50 between the user device 110 and the destination server 60. Furthermore, as applications 116 executing on the user device 110 are agnostic to the specific wireless connection 122 that is used to send or receive data packets 50 to or from the destination server 60, the connection aggregator 200 and the remote VPN sever 130 may abstract multiple wireless connections 122 into a single connection from the perspective of the destination server 60 and the applications 116 executing on the user device 110.

In some implementations, the connection aggregator 200 and the remote VPN server 130 provide session continuity while sending and receiving data packets 50 across multiple different wireless networks 120. Session continuity refers to an uninterrupted connection for the user 10 when switching between different wireless networks 120. To maintain session continuity, the remote VPN server 130 may, after authenticating the user device 110 (i.e., the connection aggregator 200), send a session token 210 to the connection aggregator 200. The session token 210 uniquely identifies the user device 110. When the connection aggregator 200 sends a data packet 50 to the remote VPN server 130 via a wireless network 120, the connection aggregator 200 may also send the session token 210 identifying the user device 110. The session token 210, when received by the remote VPN server 130, may allow the remote VPN server 130 to identify the user device 110 independent of which wireless connection 122 the connection aggregator 200 uses to connect the user device 110 and the remote VPN server 130. For example, when the user device 110 is connected to the cellular network 120a and the Wi-Fi network 120b simultaneously, the user device 110 may have a first IP address associated with the cellular network connection 122a and a second IP address different from the first IP address associated with the Wi-Fi connection 122b. In this example, when the user device 110 sends an upstream data packet 50, the connection aggregator 200 may route the data packet 50 over the Wi-Fi network 120b to the remote VPN server 130 via the Wi-Fi connection 122b and present the session token 210. The user device 110 may then move out of range of the Wi-Fi network 120b and the connection aggregator 200 may then route a subsequent upstream data packet 50 over the cellular network 120a to the remote VPN server 130 via the cellular connection 122a and again presents the same session token 210. Accordingly, the remote VPN server 130 can uniquely identify the user device 110 despite the change in IP addresses from the IP address associated with the Wi-Fi connection 122b to the subsequent IP address associated with the cellular connection 122a.

In some examples, the remote VPN server 130 may update its understanding of where to send data packets 50 based on the received session token 210. In some implementations, the remote VPN server 130 sends downstream data packets 50 to the user device 110 using the same wireless network 120 and corresponding wireless connection 122 that was used by the connection aggregator 200 when the last session token 210 was presented to the remote VPN server 130. In case of transmission failure, the remote VPN server 130 may fall back to a previous wireless connection 122 in an attempt to reestablish communication with the user device 110.

With continued reference to FIG. 1, the data processing hardware 112 also executes the multi-network controller 300. The multi-network controller 300 renders a status graphic 320 in the GUI 115 displayed on the screen 119 of the user device 110. The status graphic 320 indicates that the user device 110 is currently connected to at least one carrier-mediated wireless network 120. Here, the status graphic 320 indicates to the user 10 of the user device 110 that the user device 110 is connected to the cellular network 120a and/or the Wi-Fi network 120b. In some examples, the multi-network controller 300 renders a second status graphic 320 (not shown) to indicate connection to a carrier-mediated wireless network or user-mediated wireless network with an operator 70 that is different from the operator 70 associated with the first status graphic 320. The multi-network controller 300 may render any number of status graphics 320 to reflect any number of operators 70 of wireless connections 122 to the mobile device 110.

The multi-network controller 300, in some implementations, renders an interactive graphic 330 configured to receive user input indications 312 for disabling wireless connections 122 between the user device 110 and any available carrier-mediated wireless networks 120 associated with the same carrier or network operator 70. The interactive graphic 330 may take many forms, such as a button, switch, slider, or toggle. Other forms of user input may also provide the user input indication 312. For example, the user 10 may optionally provide the user input indication 312 by speaking a voice command that may be recorded by a microphone of the user device 110. In the example shown, the interactive graphic 330 includes a graphical button 330 labeled "Carrier Toggle" rendered on the GUI 115 that provides, when selected by the user 10, the user input indication 312 indicating that the user 10 desires to disconnect the user device 110 from all wireless connections 122 associated with the corresponding carrier/network operator 70. When the user device 110 provides wireless connections 122 to multiple carrier-mediated wireless networks 120 associated with more than one different carriers 70, the multi-network controller 300 may render a respective interactive graphic 330 for each carrier 70 on the GUI 115, allowing the user 10 control over the carrier-mediated wireless networks 120 on a carrier-by-carrier basis. Alternatively, the multi-network controller 300 may render an interactive graphic 330 for disconnecting all carrier-mediated networks 120 regardless of the specific carrier 70 that mediates each network 120.

In response to receiving the user input indication 312 indicating selection of the interactive graphic 330, the multi-network controller 300 may disconnect the user device 110 from each of the one or more carrier-mediated wireless networks 120 associated with the carrier/network operator 70 and update the status graphic 320 to indicate that the mobile device 110 is not currently connected to any carrier-mediated wireless networks 120 associated with the corresponding carrier/network operator 70. Optionally, in response to receiving the user input indication 312 indicating selection of the interactive graphic 330, the multi-network controller 300 may connect to one or more networks 120 associated with another network operator 70. For example, after disconnecting from a carrier-mediated Wi-Fi network 120b, the multi-network controller 300 may automatically (or prompt the user 10 to) connect to a user-mediated Wi-Fi network 120b if one is in range and available. In some implementations, when disconnecting from carrier-mediated wireless networks in response to receiving the user input indication 312, the multi-network controller 300 may maintain any existing wireless network connections 122 between the user device 110 and wireless networks 120 mediated by other operators 70 (i.e., other carriers or network operators associated with user-mediated networks).

In some implementations, the interactive graphic 330 is also configured to receive user input indications 312 for enabling connections between the user device 110 and any available carrier-mediated wireless networks 120 associated with the respective carrier 70. For example, after receiving a first user input indication 312 indicating selection of the interactive graphic 330 to disconnect all carrier-mediated wireless networks 120 connected to the user device 110 and operated by the associated carrier 70, a subsequent second user input indication 312 indicating selection of the interactive graphic 330 may cause the user device 110 to enable or re-connect to the carrier-mediated wireless networks 120 via the corresponding wireless connection 122. While in the example shown, the same interactive graphic 330 is used to toggle between enabling and disabling the carrier-mediated wireless networks 120, it is understood that separate interactive graphics may be used instead, e.g., a first interactive graphic for enabling and a second interactive graphic for disabling. Additionally, the interactive graphic 330 may update (e.g., textual information) to reflect whether interaction with the interactive graphic 330 will enable or disable the carrier-mediated networks 120.

When the multi-network controller 300 receives the user input indication 312 indicating selection of the interactive graphic 330 to disable the carrier-mediated wireless networks 120 associated with a particular network operator 70, the multi-network controller 300 responds by disconnecting the user device 110 from each carrier-mediated wireless network 120 associated with the particular network operator 70. The multi-network controller 300 may also update the status graphic 320 to indicate that the user device 110 is not currently connected to any carrier-mediated wireless networks 120 associated with the network operator 70. In some implementations, a single status graphic 320 indicates connection by the user device 110 to any number of carrier-mediated wireless networks 120, and in other implementations, the multi-network controller 300 renders multiple status graphics 320 in the GUI 115 each representing a respective carrier/network operator 70 providing one or more carrier-mediated wireless networks 120 that the user device 110 is connected to and capable of disconnecting from. In some implementations, the single status graphic 320 indicates connection by the user device 110 to all services provided by a single carrier network 70. In these implementations, when the status graphic 320 indicates that the user device 110 is not connected to services provided by a particular network 70, the user device 110 may still be connected to other carrier-mediated wireless networks 120 provided by a separate carrier or other user-mediated wireless networks 120. Multiple individual graphics may be provided on the user device 110, one for each carrier-mediated wireless network 120 and/or each user-mediated wireless network in these instances.

In some examples, the multi-network controller 300 provides the connection aggregator 200 an indication 340 indicating when the carrier-mediated wireless networks 120 have been enabled or disabled by the user 10. The connection aggregator 200 may use the indication 340 indicating when the carrier-mediated wireless networks 120 have been disabled for terminating the appropriate wireless connections 122 and/or otherwise disconnecting from the VPN 30. In some implementations, the user device 110 maintains an existing connection to the VPN 30, but the connection aggregator 200 will halt transmitting data packets 50 over the VPN 30 and halt forwarding data packets 50 received from the remote VPN server 130 to applications 116 executing on the user device 110.

Referring now to FIGS. 2A-2D, in some implementations, the connection aggregator 200 includes a VPN client 230. The VPN client 230 establishes point-to-point connections 122 (e.g., with tunneling protocols) over the public wireless networks 120 to include the user device 110 and the remote server 130 within the same private network, e.g., VPN 30. The VPN client 230 may implement a host of security and privacy features to protect the data packets 50. For example, the VPN client 230 may implement authentication and/or encryption. In some examples, the VPN client 230 authenticates with the VPN back-end service 132 using any or all of passwords, biometrics, digital certificates, and two-factor authentication.

The VPN client 230, in some examples, receives VPN parameters 240. The VPN parameters 240 may include network selection criteria 240a and network connection quality data 240b. The VPN client 230 may use the VPN parameters 240 to determine which connected wireless network connection 122 to transfer data packets 50 through when multiple wireless connections 122 are enabled simultaneously. In some implementations, the selection criteria 240a identifies a priority among the wireless connections 122. For example, the selection criteria 240a may indicate that the Wi-Fi network connection 122b has a higher priority than the cellular network connection 122a, and when both connections 122 are enabled simultaneously, the VPN client 230 will use the Wi-Fi network connection 122b over the cellular network connection 122a. In other words, when the user device 110 is simultaneously connected to at least two carrier-mediated wireless networks associated with a same network operator 70, the selection criteria 240a may identify one of the at least two carrier-mediated networks 120 as a priority carrier-mediated wireless network 120 associated with the network operator 70. Optionally, the multi-network controller 300 may use the status graphic 320 to indicate that the mobile device 110 is currently connected to the priority carrier-mediated wireless network 120.

In some examples, the VPN client 230 may determine which connection 122 to use at least in part based on the connection quality data 240b. The connection quality data 240b may quantify a quality of each wireless connection 122 between the mobile device 110 and the remote VPN server 130. The VPN client 230 may identify which network connection 122 has a highest connection quality and transmit data packets 50 using the identified network connection. In other words, when the user device 110 is simultaneously connected to at least two carrier-mediated wireless networks associated with a same network operator 70, the VPN client 230 may identify which carrier-mediated wireless network 120 of the at least two carrier-mediated wireless network 120 is associated with a highest connection quality based on the connection quality data 240b. Optionally, the multi-network controller 300 may use the status graphic 320 to indicate that the mobile device 110 is currently connected to the carrier-mediated wireless network 120 with the highest connection quality. For instance, the status graphic rendered in the GUI 115 may further indicate a value of the connection quality of the connection 122 between mobile device 110 and the identified carrier-mediated wireless network 120 associated with the highest connection quality.

The VPN client 230 may use quality thresholds 240c that, when satisfied, cause the VPN client 230 to switch from using one wireless network 120 for communicating data packets 150 over to another wireless network 120. For example, while simultaneously connected to the cellular network 120a via the cellular connection 122a and Wi-Fi network 120b via the Wi-Fi network connection 122b, the user 10 may move the mobile device 110 away from an access point of the Wi-Fi network 120b until the quality of the connection 122b degrades to a threshold level due to the distance from the access point. At this threshold level, the VPN client 230 may switch from transmitting data packets 50 over the Wi-Fi network 120b to transmitting the data packets 50 over the cellular network 120a in order to avoid impacting user experience. The thresholds may be predetermined (e.g., via the user) or may be dynamic based on location, number of connections 122, quality of connections 240b, and priority of the connections.

Figure 2A:
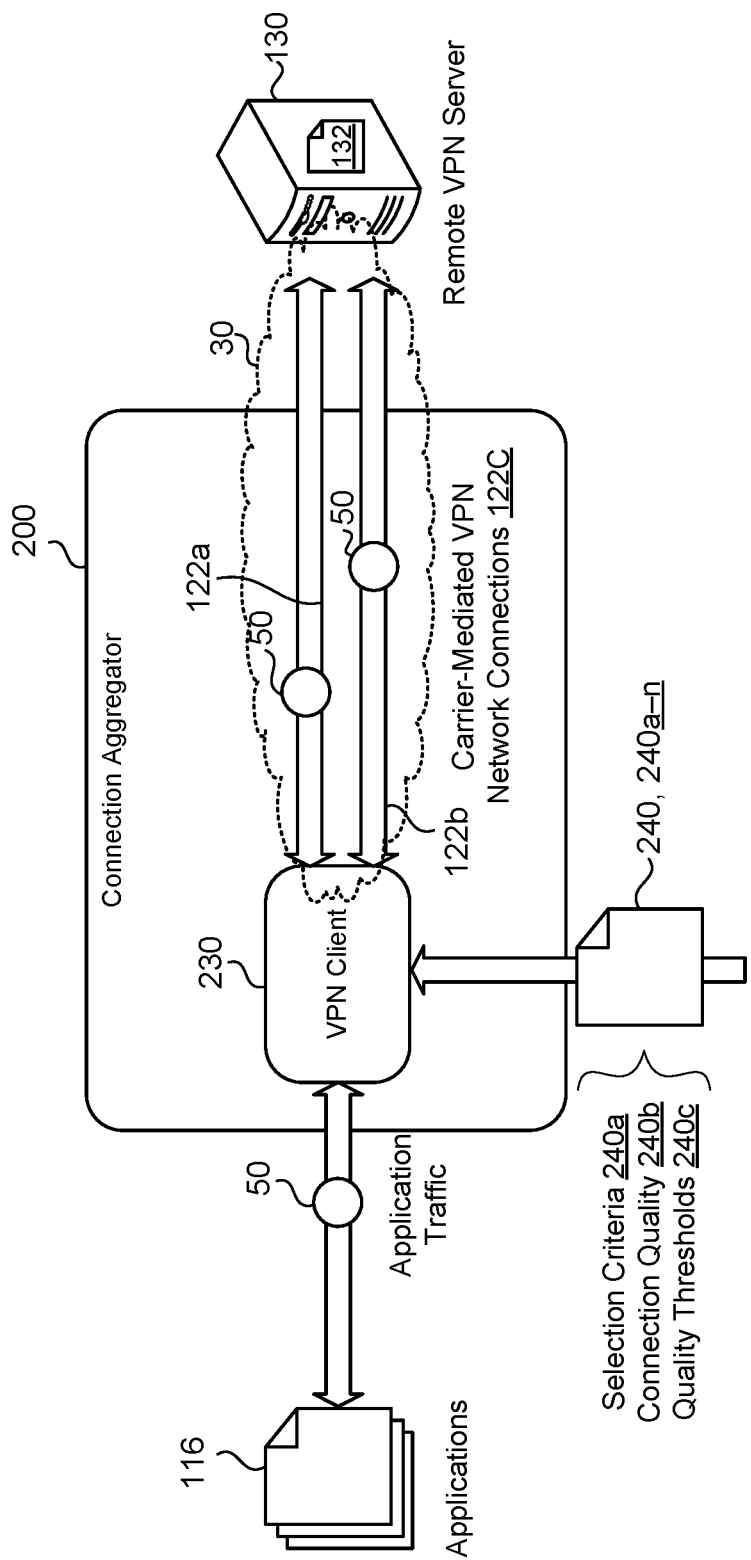
FIGS. 2A-2C are schematic views of exemplary components of a connection aggregator.

Referring now to FIG. 2A, the VPN client 230 establishes carrier-mediated VPN network connections 122C for each wireless connection 122 mediated by a carrier 70 to establish the VPN 30. For example, the VPN client 230 may establish the cellular network connection 122a between the VPN client 230 and the remote VPN server 130 and the wireless network connection 122b (i.e., when the associated Wi-Fi network 120 is carrier-mediated) between the VPN client 230 and the remote VPN server 130. The VPN client 230 may receive application traffic (i.e., data packets 50) from applications 116 executing on the user device 110. After receiving a data packet 50, the VPN client 230 may determine which active carrier-mediated VPN network connection 122C to use to transmit the data packet 50 based on the VPN parameters 240.

Figure 2B:
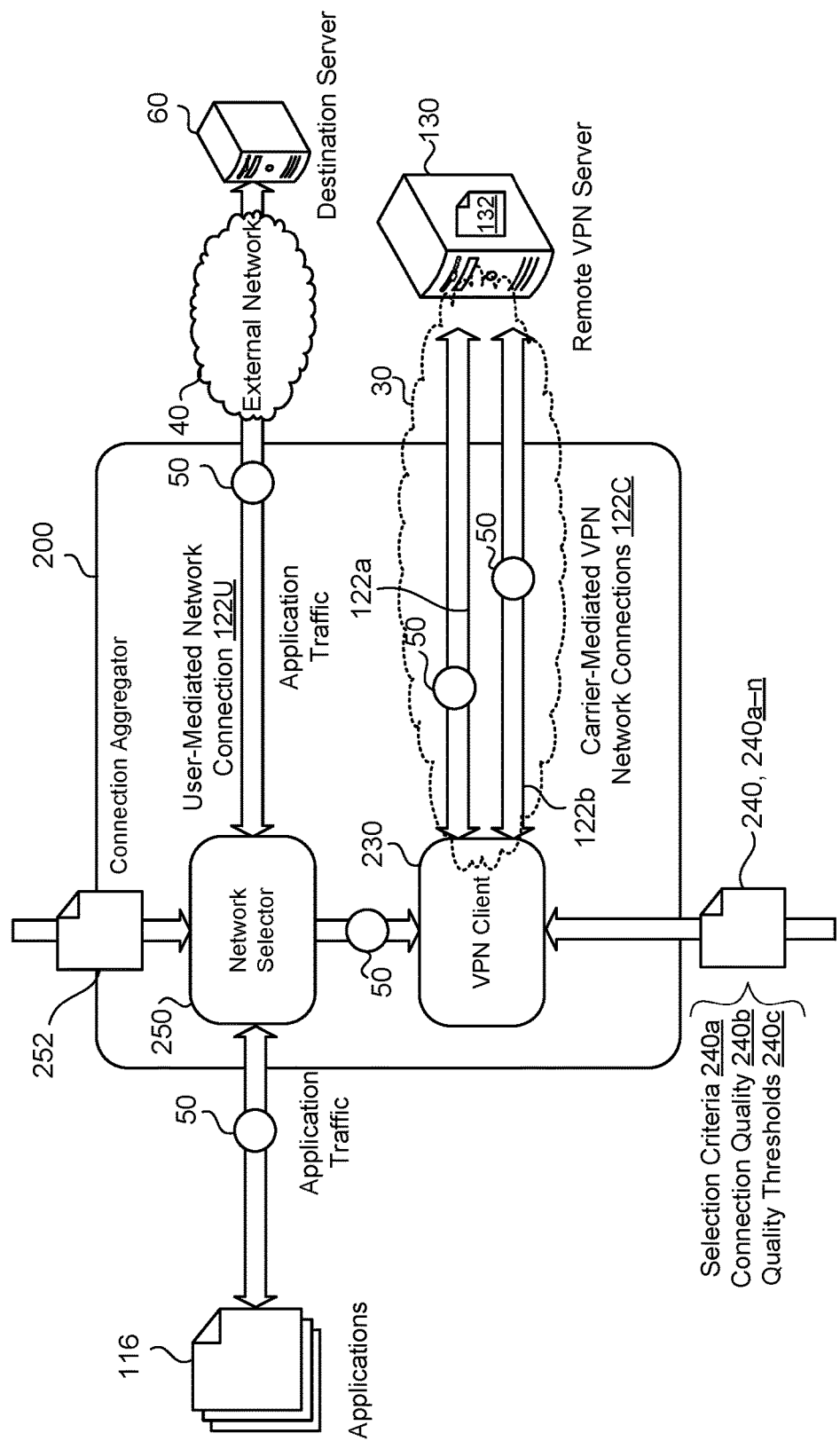

Referring now to FIG. 2B, in some implementations, the user device 110 connects to both one or more carrier-mediated VPN network connections 122C and one or more user-mediated network connections 122U simultaneously. For example, the mobile device 110 may have a cellular wireless connection 122a to a cellular network 120a operated by a carrier 70, while simultaneously have a Wi-Fi wireless connection 122b to a Wi-Fi network 120b operated by the user 10 (e.g., a home Wi-Fi of the user). Here, the user-mediated network connections 122U may bypass the VPN 30 and instead transmit application traffic (i.e., data packets 50) directly to the destination server 60 through the external network 40. In this case, a network selector 250 may receive the data packets 50 and determine, based on priority data 252, whether to use a user-mediated network connection 122U or a carrier-mediated VPN network connection 122C. For example, the user-mediated Wi-Fi network connection 122b may be preferred due to lower costs than the carrier-mediated cellular network connection 122a. Optionally, the multi-network controller 300 may indicate with the status graphic 320 that the mobile device 110 is currently connected to the priority wireless network 120 (i.e., either a carrier-mediated network connection 122C or a user-mediated network connection 122U). In some examples, the status graphic 320 does not indicate which wireless network 120 the mobile device 110 is connected to (i.e., which radios of the mobile device are connected) and instead only indicates whether the mobile device 110 is connected to a user-mediated network 120 or to a carrier-mediated network 120.

Figure 2C:
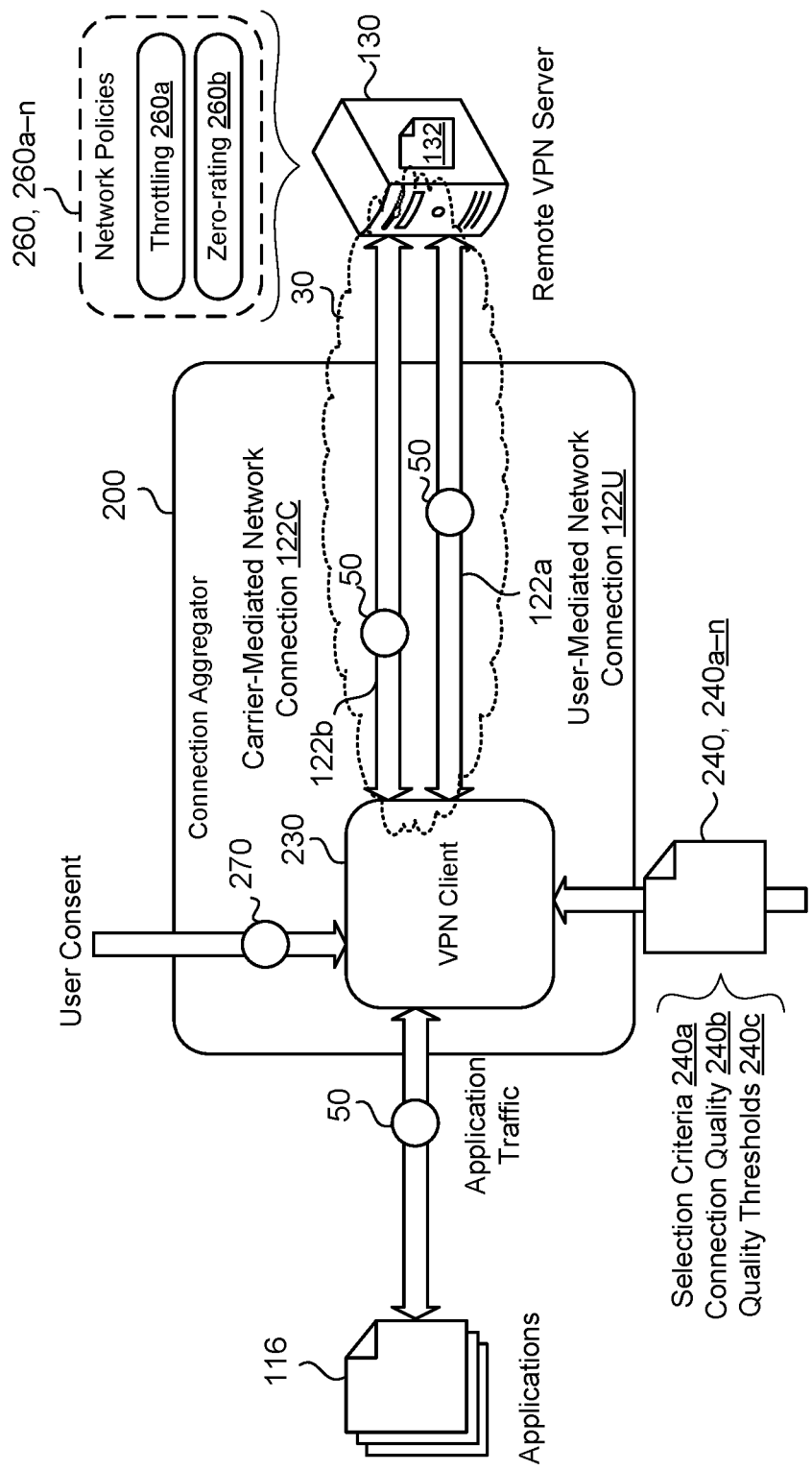

Referring now to FIG. 2C, in some implementations, the user-mediated network connections 122U associated with user-mediated wireless networks 120 are also established within the VPN 30. For example, a carrier-mediated cellular network connection 122a connecting the mobile device 110 to the VPN server 130 over a carrier-mediated cellular network 120 and a user-mediated Wi-Fi network connection 122b connecting the mobile device 110 to the VPN server 130 over a user-mediated Wi-Fi network 120b may both be established between the VPN client 230 and the remote VPN server 130. In this case, all application traffic (i.e., data packets 50) may be routed to the VPN client 230 and the VPN client 230 may determine which connection 122 to transmit each data packet 50 on based on VPN parameters 240 as previously discussed.

Figure 2D:
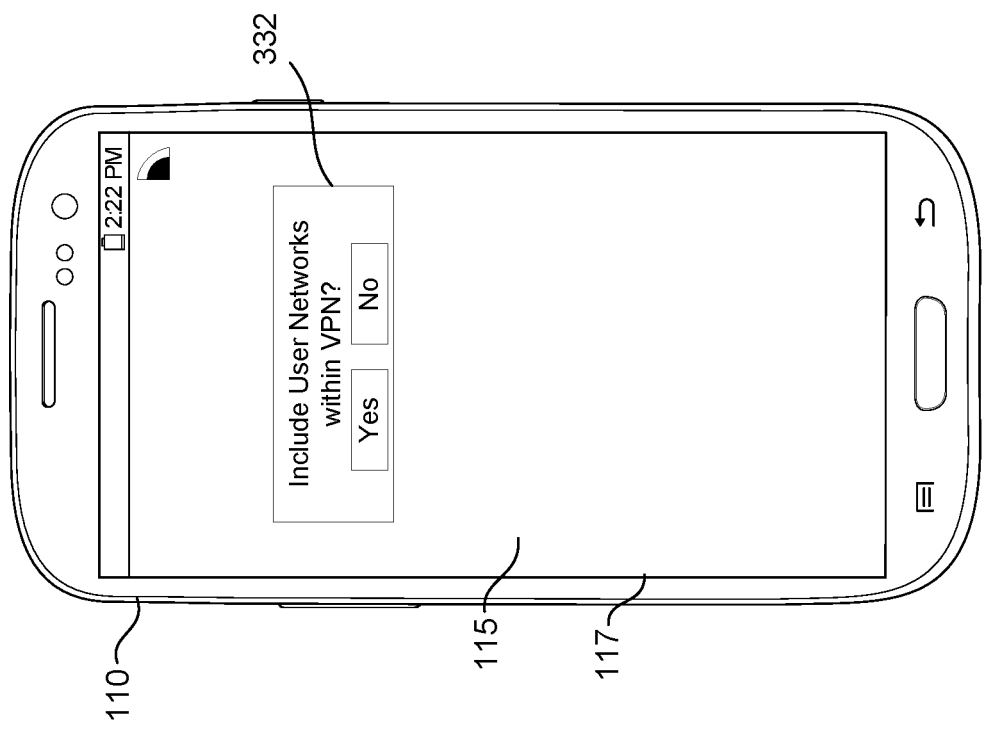
FIG. 2D is a schematic view of an interactive graphic rendered on a graphical user interface executing on a mobile device.

Prior to including any user-mediated network connections 122U within the VPN 30, the connection aggregator 200 may prompt the user 10 of the mobile device 110 to provide consent 270 to permit the VPN client 230 to establish the VPN user-mediated wireless connection 122U connecting the user device 110 to the remote VPN server 130 over a user-mediated wireless network 120. In some examples, when the connection aggregator 200 prompts the user 10 of the mobile device 110 to provide the consent 270 to permit the VPN 30 to establish a connection using a user-mediated wireless network 120, the connection aggregator 200 displays an interactive graphic 332 (FIG. 2D) in the GUI 115. The interactive graphic 332 enables the user 10 to provide the consent 270 to permit the VPN 30 to establish the user-mediated connection 122U. For example, as illustrated in FIG. 2D, the GUI 115 may display an interactive graphic 332 that includes textual information (e.g., "Include User Networks within VPN?") along with buttons enabling the user 10 to consent (e.g., by selecting "Yes") or not consent (e.g., by selecting "No") to using the VPN 30 for the connections.

Referring back to FIG. 2C, in some implementations, the remote VPN server 130 applies one or more network policies 260, 260a—n to each wireless connection 122 established through the VPN 30 with the VPN client 230. In some examples, the remote VPN server 130 applies the one or more network policies 260 to only connections 122 to carrier-mediated networks 120 (i.e., excluding user-mediated networks 120 from the network policies 260) even when the user 10 has consented to including user-mediated networks within the VPN 30. The network policies 260 may apply a variety of network-side features. For example, the remote VPN server 130 may apply a throttling policy 260a to the connections 122 that throttle data of certain types, at certain times, or at certain thresholds of consumption. The remote VPN server 130 may additionally or alternatively apply a zero-rating policy 260b. The zero-rating policy 260b may provide Internet access with reduced financial cost under certain conditions. For example, costs of access may be reduced based on an increase in advertising or limiting access to certain websites.

Figure 3:
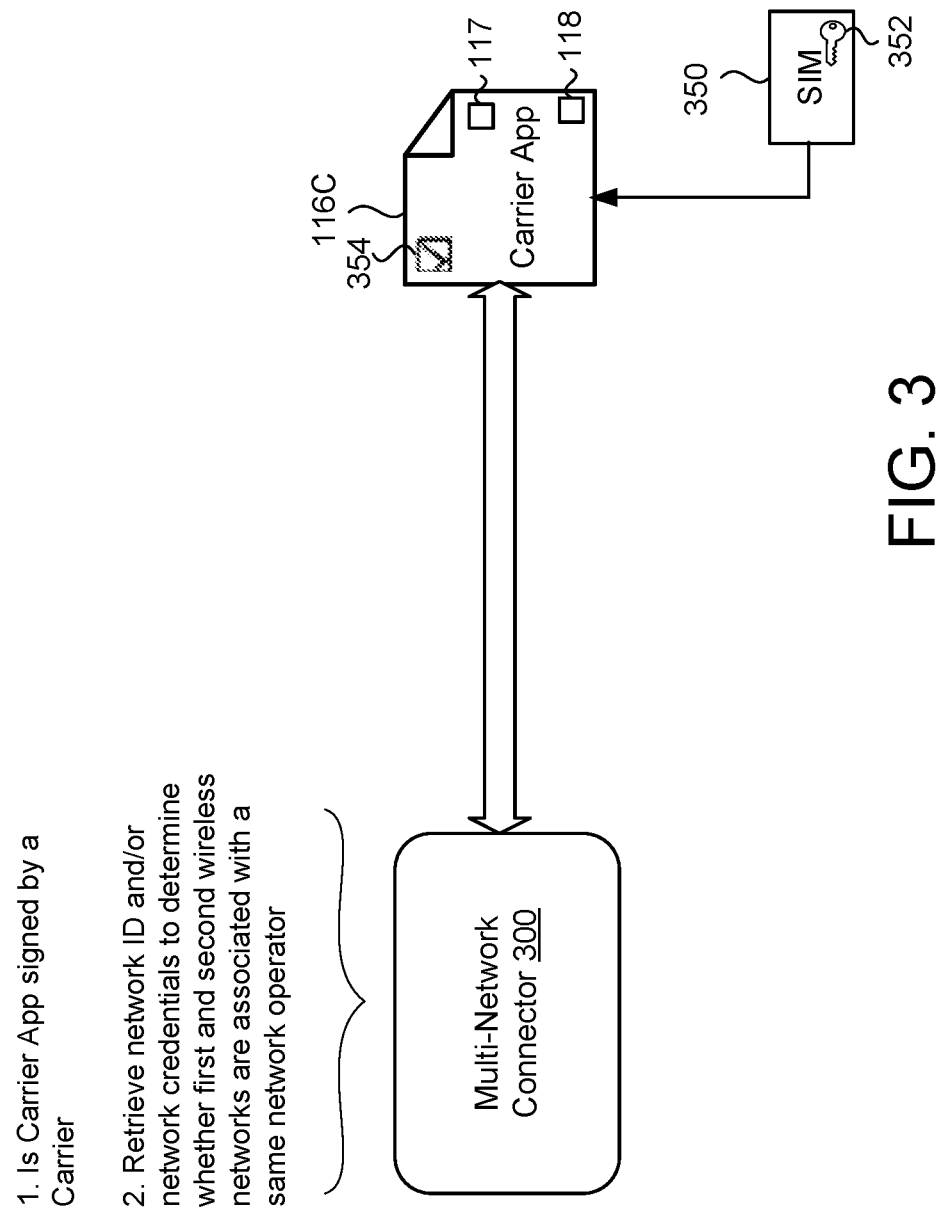
FIG. 3 is a schematic view of a multi-network connector.

Referring now to FIG. 3, when the user device 110 is simultaneously connected to the first wireless network 120a (e.g., cellular network) and the second wireless network 120b (e.g., Wi-Fi network), the multi-network controller 300 may determine whether the first wireless network 120a is associated with a same network operator 70 as the second wireless network 120b by querying a carrier application 116, 116C installed/executing on the user device 110. The carrier application 116 may be associated with a particular carrier/network operator, e.g., a MNO or a MVNO. In some examples, the multi-network controller 300 first verifies that the carrier application 116C is associated with the carrier 70 by determining whether the carrier application 116C is digitally signed by the carrier 70. For instance, the carrier 70 may provide the digital signature 354 using a cryptographic key of 352 of the carrier 70. The key 352 may be included, for example, within the SIM 350, which may include the embedded SIM (eSIM). When the multi-network controller 300 verifies the carrier application 116C via the presence of the digital signature 354 signed by the key 352 associated with the carrier 70, the multi-network controller 300 may then retrieve network identifications (IDs) 117 and/or network credentials 118 (e.g., a password) for each wireless network 120 associated with, and mediated by, the carrier 70. Accordingly, using the retrieved network IDs 117 and/or network credentials 118, the multi-network controller 300 may determine whether the first wireless network 120a and the second wireless network 120b are associated with (e.g., mediated by) the same carrier 70. In some cases, a wireless network 120 may need credentials 118 prior to connection (e.g., a Wi-Fi network 120b) and the multi-network controller 300 may retrieve these credentials 118 from the appropriate carrier application 116C to access the associated network 120. In some examples, the carrier application 116C "pushes" or otherwise provisions the multi-network controller 300 with credentials 118 for associated carrier-mediated networks 120. The carrier application 116C may query the multi-network controller 300 (or otherwise the OS of the user device 110) to determine if the user device 110 is currently connected to one of the carrier's networks 120.

Referring now to FIGS. 4A and 4B, in some implementations, the status graphic 320 rendered in the GUI 115 of the mobile device 110 updates to indicate a connection to at least one carrier-mediated wireless network or at least one user-mediated wireless network associated with a select operator 70. For example, the status graphic 320a (FIG. 4A) rendered in the GUI 115 indicates that the mobile device 110 is currently connected to a carrier-mediated wireless network. While not shown, when the mobile device 110 is connected to both a carrier-mediated wireless network (e.g., cellular network 120a) and a user-mediated wireless network (e.g., Wi-Fi network 120b) simultaneously, two status graphics 320 may be rendered in the GUI 115 each indicating a respective one of the connections to the carrier-mediated wireless network or the user-mediated-wireless network. Here, the two status graphics 320 may be differentiable (e.g., different graphics, orientations, colors, etc.) so that the user 10 can differentiate which types of wireless networks 120 the user device 110 is connected to. FIG. 4A also shows a first interactive graphic 330, 330a configured to receive user input indications for selecting between disabling connections 122 between the mobile device 110 and any available carrier-mediated wireless networks 120 associated with the select operator 70 (i.e., represented by the status graphic 320a) and enabling connections 122 between the mobile device 110 and any available carrier-mediated wireless networks 120 associated with the select operator 70. In response to a first user input indication 312 indicating selection of the rendered first interactive graphic 330a (i.e., selecting "Yes" to disable carrier data), the mobile device 110 disconnects from the carrier-mediated wireless network. In some examples, the mobile device 110 also connects to a user-mediated wireless network 120 (e.g., the user's Wi-Fi network). In response to the first input indication 312, FIG. 4B shows the status graphic 320a updating by rendering status graphic 320b in the GUI 115 to indicate that the mobile device 110 is not currently connected to any carrier-mediated wireless networks 120 associated with the operator 70. In some examples, the status graphic 320b may also update to indicate that the mobile device 110 is now currently connected to the user-mediated wireless network 120. Here, the status graphic 320b of FIG. 4B includes an orientation that is rotated relative to the status graphic 320a of FIG. 4A. In other examples, the status graphic 320b may include an entirely different graphic than the status graphic 320a, include a different color, and/or include any other distinguishable features to allow the user 10 to discern between status graphics 320a indicating connections to carrier-mediated wireless networks 120 and status graphics 320b indicating connections to user-mediated wireless networks 120. FIG. 4B also shows the mobile device 110 rendering a subsequent second interactive graphic 330b in the GUI 115 prompting the user 10 to enable carrier data. Here, the user may provide a second user input indication 312 indicating selection of the second interactive graphic 330b to enable carrier data (i.e., selecting "Yes" to enable carrier data), and the status graphic 320b may revert back to the status graphic 320a rendered in the GUI 115 of FIG. 4A appropriately. Both status graphics 320a, 320b may visually indicate a quality of the connection (e.g., signal strength) to the currently connected wireless network. Thus, the status graphics 320a, 320b provide a convenient and quick way for a user to determine whether or not the mobile device 110 is connected to a carrier-mediated wireless network or a user-mediated wireless network, as well as optionally providing a quality of the connection.

Figure 5:
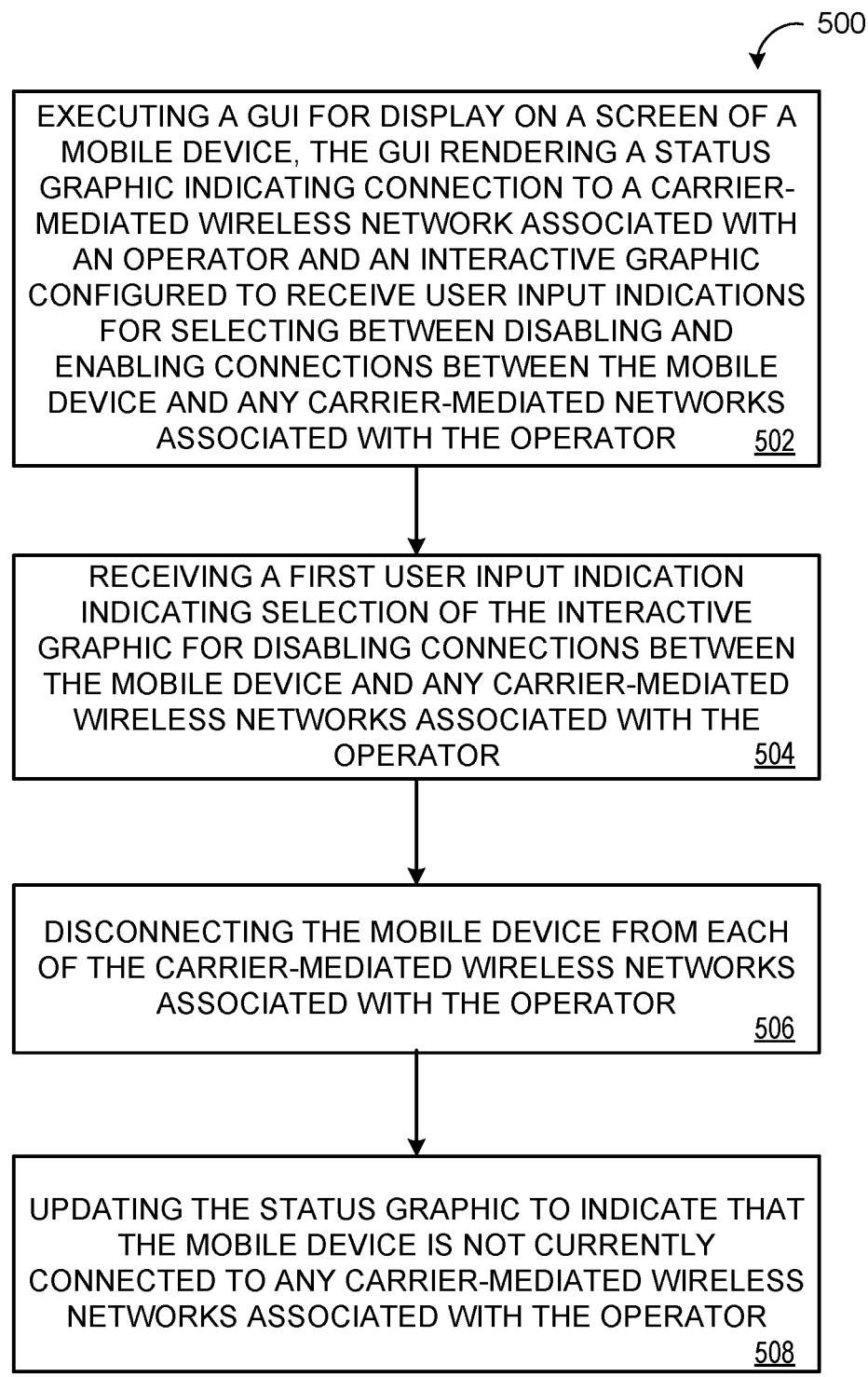
FIG. 5 is a flowchart of an example arrangement of operations for a method of toggling multi-network connectivity.

FIG. 5 is a flowchart of an exemplary arrangement of operations for a method 500 of toggling multi-network connectivity of a mobile device 110. The method 500 starts at operation 502 for a mobile device 110 simultaneously connected to one or more carrier-mediated wireless networks 120 associated with a first network operator 70, executing, by data processing hardware 112 of the mobile device 110, a graphical user interface 115 for display on a screen 119 in communication with the data processing hardware 112. The graphical user interface 115 renders a status graphic 320 indicating the mobile device 110 is currently connected to at least one carrier-mediated wireless network 120 of the one or more carrier-mediated wireless networks 120 associated with the first network operator 70. The graphical user interface 115 also renders an interactive graphic 330 configured to receive user input indications for selecting between disabling connections 122 between the mobile device 110 and any available carrier-mediated wireless networks 120 associated with the first network operator 70 and enabling connections 122 between the mobile device 110 and any available carrier-mediated wireless networks 120 associated with the first network operator 70.

At step 504, the method 500 includes receiving, at the data processing hardware 112, a first user input indication 312 indicating selection of the interactive graphic 330 rendered in the graphical user interface 115 for disabling connections 122 between the mobile device 110 and any available carrier-mediated wireless networks 120 associated with the first network operator 70. At step 506, in response to receiving the first user input indication 312, the method includes disconnecting, by the data processing hardware 112, the mobile device 110 from each of the one or more carrier-mediated wireless networks 120 associated with the first network operator 70. At step 508, the method includes updating, by the data processing hardware 112, the status graphic 320 to indicate that the mobile device 110 is not currently connected to any carrier-mediated wireless networks 120 associated with the first network operator 70.

Figure 6:
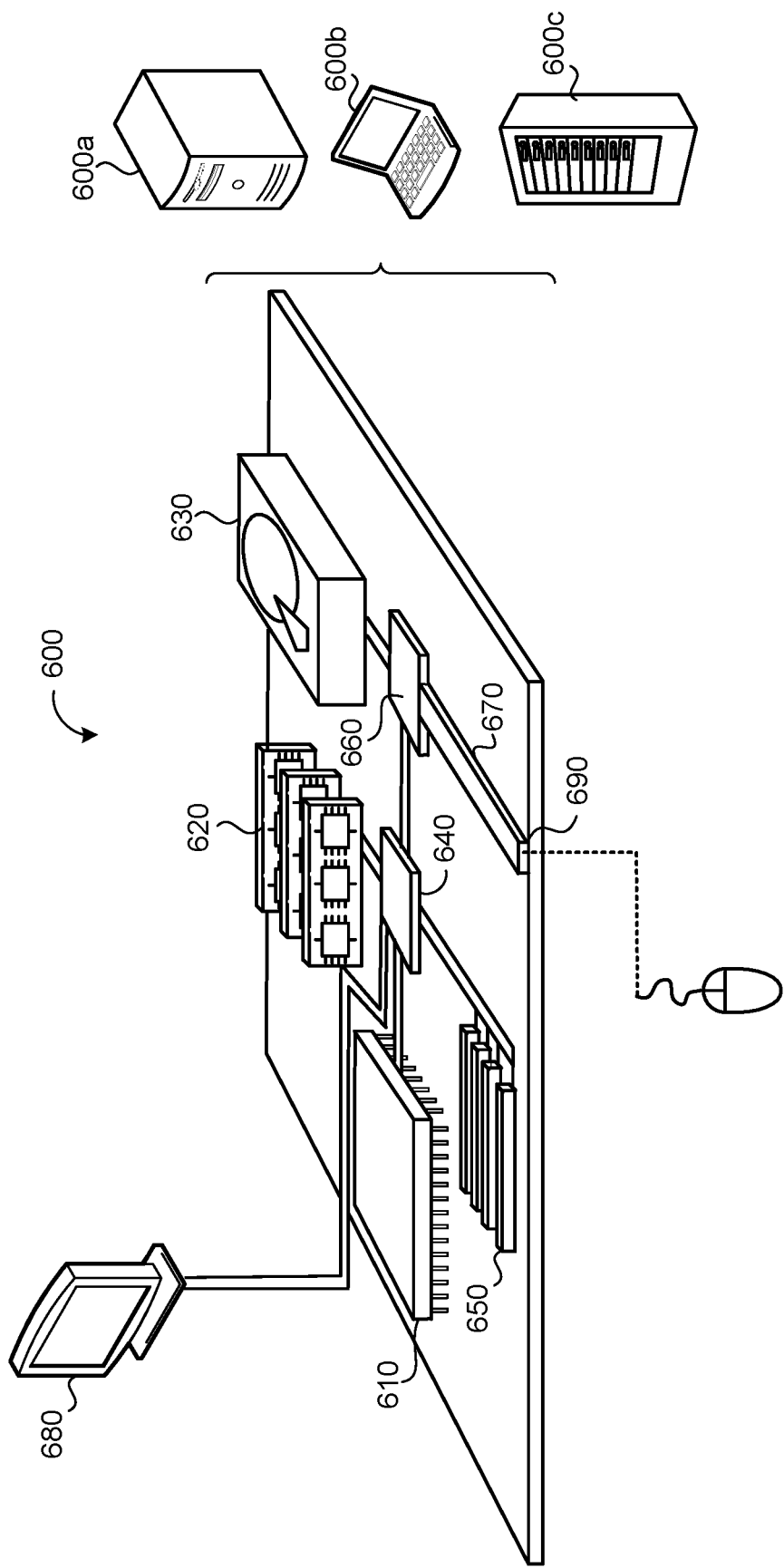
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   for a mobile device connected to one or more carrier-mediated wireless networks associated with a first network operator, each network simultaneously connected to the mobile device, executing, by data processing hardware of the mobile device, a connection aggregator establishing a virtual private network (VPN) between the mobile device and a remote server, and a graphical user interface for display on a screen in communication with the data processing hardware, the graphical user interface rendering:
      a status graphic indicating the mobile device is currently connected to at least one carrier-mediated wireless network of the one or more carrier-mediated wireless networks associated with the first network operator; and
      an interactive graphic configured to receive user input indications for selecting between disabling connections between the mobile device and any available carrier-mediated wireless networks associated with the first network operator and enabling connections between the mobile device and any available carrier-mediated wireless networks associated with the first network operator;
   receiving, at the data processing hardware, a first user input indication indicating selection of the interactive graphic rendered in the graphical user interface for disabling connections between the mobile device and any available carrier-mediated wireless networks associated with the first network operator; and
   in response to receiving the first user input indication:
      disconnecting, by the data processing hardware, the mobile device from each of the one or more carrier-mediated wireless networks associated with the first network operator;
      connecting, by the data processing hardware, the mobile device to one or more user-mediated wireless networks; and
      updating, by the data processing hardware, the status graphic to indicate that the mobile device is not currently connected to any carrier-mediated wireless networks associated with the first network operator and is instead connected to the one or more user-mediated wireless networks,
   wherein, the connections between the mobile device and the one or more carrier-mediated wireless networks are established within the VPN, the connections between the mobile device and the one or more user-mediated wireless networks are established within the VPN, and the connection aggregator is configured to prompt a user of the mobile device to provide consent to include the one or more user-mediated wireless networks within the VPN prior to the mobile device being connected to the one or more user-mediated wireless networks.

2. The method of claim 1, further comprising, when the mobile device is simultaneously connected to at least two carrier-mediated wireless networks associated with the first network operator:
   identifying, by the data processing hardware, one of the at least two carrier-mediated wireless networks as a priority carrier-mediated wireless network associated with the first network operator,
   wherein the status graphic rendered in the graphical user interface indicates the mobile device is currently connected to the priority carrier-mediated wireless network.

3. The method of claim 1, further comprising, when the mobile device is simultaneously connected to at least two carrier-mediated wireless networks associated with the first network operator:
   for each carrier-mediated wireless network of the at least two carrier-mediated wireless networks the mobile device is simultaneously connected to, determining, by the data processing hardware, a connection quality of the connection between the mobile device and the corresponding carrier-mediated wireless network; and
   identifying, by the data processing hardware, which carrier-mediated wireless network of the at least two carrier-mediated wireless networks the mobile device is simultaneously connected to is associated with a highest connection quality,
   wherein the status graphic rendered in the graphical user interface indicates the connection between the mobile device and the identified carrier-mediated wireless network associated with the highest connection quality.

4. The method of claim 3, wherein the status graphic rendered in the graphical user interface further indicates a value of the connection quality of the connection between the mobile device and the identified carrier-mediated wireless network associated with the highest connection quality.

5. The method of claim 1, wherein, prior to receiving the first user input indication, the mobile device is simultaneously connected to at least a first carrier-mediated wireless network and a second carrier-mediated wireless network, the first carrier-mediated wireless network comprising a carrier-mediated cellular network associated with the first network operator and the second carrier-mediated wireless network comprising a carrier-mediated Wireless Fidelity network associated with the first network operator.

6. The method of claim 1, further comprising, in response to receiving the first user input indication, connecting, by the data processing hardware, the mobile device to one or more wireless networks associated with a second network operator different than the first network operator.

7. The method of claim 6, wherein:
   disconnecting the mobile device from each of the one or more carrier-mediated wireless networks associated with the first network operator comprises disconnecting the mobile device from at least one Wireless Fidelity network among the one or more carrier-mediated wireless networks associated with the first network operator; and
   connecting the mobile device to the one or more wireless networks associated with the second network operator comprises connecting the mobile device to at least one Wi-Fi network among the one or more wireless networks associated with the second network operator.

8. The method of claim 6, wherein the one or more wireless networks associated with the second network operator comprise carrier-mediated wireless networks or user-mediated wireless networks.

9. The method of claim 6, wherein, when the one or more wireless networks associated with the second network operator comprise user-mediated wireless networks, updating the status graphic to indicate that the mobile device is not currently connected to any carrier-mediated wireless networks associated with the first network operator in response to receiving the first user input indication further comprises updating the status graphic to indicate that the mobile device is now currently connected to the one or more user-mediated wireless network associated with the second network operator.

10. The method of claim 1, further comprising, in response to receiving the first user input indication, maintaining, by the data processing hardware, any existing connections between the mobile device and wireless networks associated with network operators other than the first network operator.

11. The method of claim 1, further comprising, after receiving the first user input indication:
receiving, at the data processing hardware, a second user input indication indicating selection of the interactive graphic rendered in the graphical user interface for enabling connections between the mobile device and any available carrier-mediated wireless networks associated with the first network operator; and
in response to receiving the second user input indication:
connecting, by the data processing hardware, the mobile device to one or more available carrier-mediated wireless networks associated with the first network operator; and
re-updating, by the data processing hardware, the status graphic to indicate that the mobile device is currently connected to at least one carrier-mediated wireless network associated with the first network operator.

12. The method of claim 1, wherein executing the graphical user interface for display on the screen further causes the graphical user interface to render a second status graphic indicating the mobile device is currently connected to at least one wireless network that is not associated with the first network operator.

13. The method of claim 1, further comprising displaying, by the data processing hardware, a second graphical indication indicating a connection quality of at least one wireless connection associated with a different operator.

14. The method of claim 1, wherein, when connections between the mobile device and any available carrier-mediated wireless networks associated with the first network operator are disabled in response to receiving the first user input indication, a radio of the mobile device associated with at least one of the carrier-mediated wireless networks associated with the first network operator remains enabled.

15. A system comprising:
data processing hardware of a mobile device; and
memory hardware in communication with the data processing hardware, the memory hardware storing instructions that when executed on the data processing hardware cause the data processing hardware to perform operations comprising:
for a mobile device connected to one or more carrier-mediated wireless networks associated with a first network operator, each network simultaneously connected to the mobile device, executing a connection aggregator establishing a virtual private network (VPN) between the mobile device and a remote server, and a graphical user interface for display on a screen in communication with the data processing hardware, the graphical user interface rendering:
a status graphic indicating the mobile device is currently connected to at least one carrier-mediated wireless network of the one or more carrier-mediated wireless networks associated with the first network operator; and
an interactive graphic configured to receive user input indications for selecting between disabling connections between the mobile device and any available carrier-mediated wireless networks associated with the first network operator and enabling connections between the mobile device and any available carrier-mediated wireless networks associated with the first network operator;
receiving a first user input indication indicating selection of the interactive graphic rendered in the graphical user interface for disabling connections between the mobile device and any available carrier-mediated wireless networks associated with the first network operator; and
in response to receiving the first user input indication:
disconnecting the mobile device from each of the one or more carrier-mediated wireless networks associated with the first network operator;
connecting the mobile device to one or more user-mediated wireless networks; and
updating the status graphic to indicate that the mobile device is not currently connected to any carrier-mediated wireless networks associated with the first network operator and is instead connected to the one or more user-mediated wireless networks,
wherein, the connections between the mobile device and the one or more carrier-mediated wireless networks are established within the VPN, the connections between the mobile device and the one or more user-mediated wireless networks are established within the VPN, and the connection aggregator is configured to prompt a user of the mobile device to provide consent to include the one or more user-mediated wireless networks within the VPN prior to the mobile device being connected to the one or more user-mediated wireless networks.

16. The system of claim 15, further comprising, when the mobile device is simultaneously connected to at least two carrier-mediated wireless networks associated with the first network operator:
identifying one of the at least two carrier-mediated wireless networks as a priority carrier-mediated wireless network associated with the first network operator,
wherein the status graphic rendered in the graphical user interface indicates the mobile device is currently connected to the priority carrier-mediated wireless network.

17. The system of claim 15, further comprising, when the mobile device is simultaneously connected to at least two carrier-mediated wireless networks associated with the first network operator:
for each carrier-mediated wireless network of the at least two carrier-mediated wireless networks the mobile device is simultaneously connected to, determining a connection quality of the connection between the mobile device and the corresponding carrier-mediated wireless network; and identifying which carrier-mediated wireless network of the at least two carrier-mediated wireless networks the mobile device is simultaneously connected to is associated with a highest connection quality,
wherein the status graphic rendered in the graphical user interface indicates the connection between the mobile device and the identified carrier-mediated wireless network associated with the highest connection quality.

18. The system of claim 17, wherein the status graphic rendered in the graphical user interface further indicates a value of the connection quality of the connection between the mobile device and the identified carrier-mediated wireless network associated with the highest connection quality.

19. The system of claim 15, wherein, prior to receiving the first user input indication, the mobile device is simultaneously connected to at least a first carrier-mediated wireless network and a second carrier-mediated wireless network, the first carrier-mediated wireless network comprising a carrier-mediated cellular network associated with the first network operator and the second carrier-mediated wireless network comprising a carrier-mediated Wireless Fidelity network associated with the first network operator.

20. The system of claim 15, further comprising, in response to receiving the first user input indication, connecting the mobile device to one or more wireless networks associated with a second network operator different than the first network operator.

21. The system of claim 20, wherein:
disconnecting the mobile device from each of the one or more carrier-mediated wireless networks associated with the first network operator comprises disconnecting the mobile device from at least one Wireless Fidelity network among the one or more carrier-mediated wireless networks associated with the first network operator; and
connecting the mobile device to the one or more wireless networks associated with the second network operator comprises connecting the mobile device to at least one Wi-Fi network among the one or more wireless networks associated with the second network operator.

22. The system of claim 20, wherein the one or more wireless networks associated with the second network operator comprise carrier-mediated wireless networks or user-mediated wireless networks.

23. The system of claim 20, wherein, when the one or more wireless networks associated with the second network operator comprise user-mediated wireless networks, updating the status graphic to indicate that the mobile device is not currently connected to any carrier-mediated wireless networks associated with the first network operator in response to receiving the first user input indication further comprises updating the status graphic to indicate that the mobile device is now currently connected to the one or more user-mediated wireless network associated with the second network operator.

24. The system of claim 15, further comprising, in response to receiving the first user input indication, maintaining any existing connections between the mobile device and wireless networks associated with network operators.

25. The system of claim 15, further comprising, after receiving the first user input indication:
receiving a second user input indication indicating selection of the interactive graphic rendered in the graphical user interface for enabling connections between the mobile device and any available carrier-mediated wireless networks associated with the first network operator; and
in response to receiving the second user input indication:
connecting the mobile device to one or more available carrier-mediated wireless networks associated with the first network operator; and
re-updating the status graphic to indicate that the mobile device is currently connected to at least one carrier-mediated wireless network associated with the first network operator.

26. The system of claim 15, wherein executing the graphical user interface for display on the screen further causes the graphical user interface to render a second status graphic-P indicating the mobile device is currently connected to at least one wireless network that is not associated with the first network operator.

27. The system of claim 15, wherein the operations further comprise displaying a second graphical indication indicating a connection quality of at least one wireless connection associated with a different operator.

28. The system of claim 15, wherein, when connections between the mobile device and any available carrier-mediated wireless networks associated with the first network operator are disabled in response to receiving the first user input indication, a radio of the mobile device associated with at least one of the carrier-mediated wireless networks associated with the first network operator remains enabled.

* * * * *